US011252193B2

(12) United States Patent
Kelly (10) Patent No.: US 11,252,193 B2
(45) Date of Patent: Feb. 15, 2022

(54) ATTESTATION SERVICE FOR ENFORCING PAYLOAD SECURITY POLICIES IN A DATA CENTER

(71) Applicant: Microsoft Technology Licensing, LLC, Redmond, WA (US)

(72) Inventor: Bryan D. Kelly, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 294 days.

(21) Appl. No.: 16/395,985

(22) Filed: Apr. 26, 2019

(65) Prior Publication Data

US 2020/0344265 A1    Oct. 29, 2020

(51) Int. Cl.
*H04L 29/00* (2006.01)
*H04L 29/06* (2006.01)
*H04L 9/32* (2006.01)

(52) U.S. Cl.
CPC ............ *H04L 63/20* (2013.01); *H04L 9/3268* (2013.01)

(58) Field of Classification Search
CPC . H04L 63/20; H04L 9/3268; H04L 29/06578; H04L 29/06986; H04L 63/0227; H04L 63/0254; G06F 21/10
See application file for complete search history.

(56) References Cited

U.S. PATENT DOCUMENTS

| 2010/0023755 | A1  | 1/2010 | Kotani et al. | |
| 2017/0286093 | A1* | 10/2017 | Steshenko | G06F 8/71 |
| 2018/0109538 | A1* | 4/2018 | Kumar | H04L 63/08 |
| 2018/0330093 | A1* | 11/2018 | Shivanna | G06F 9/4401 |
| 2018/0373881 | A1  | 12/2018 | Thom et al. | |
| 2019/0073478 | A1* | 3/2019 | Khessib | G06F 21/572 |

OTHER PUBLICATIONS

England, et al., "RIoT—A Foundation for Trust in the Internet of Things", In Microsoft Research, MSR-TR-2016-18, Apr. 2016, 17 Pages.
Kelly, et al., "Project Cerberus Firmware Challenge Specification", Retrieved From: https://github.com/opencomputeproject/Project_Olympus/blob/master/Project_Cerberus/Project%20Cerberus%20Challenge%20Protocol.pdf, Oct. 28, 2017, 57 Pages.
Kelly, Bryan, "Project Cerberus Processor Cryptography Specification", Retrieved From: https://github.com/opencomputeproject/Project_Olympus/blob/master/Project_Cerberus/Project%20Cerberus%20Processor%20Cryptography.pdf, Aug. 28, 2017, 18 Pages.

(Continued)

*Primary Examiner* — Jeffrey C Pwu
*Assistant Examiner* — Helai Salehi
(74) *Attorney, Agent, or Firm* — Ranjeev Singh; Singh Law, PLLC (57) ABSTRACT

Systems and methods for associated with an attestation service for enforcing payload security policies in a data center are provided. An example method includes sending artifacts, including at least one artifact purportedly associated with a root of trust system corresponding to a device, to an attestation service, wherein the at least one artifact comprises at least one policy attribute related to payload security in the data center. The method further includes the attestation service determining whether the at least one policy attribute is acceptable.

20 Claims, 8 Drawing Sheets

(56) References Cited

OTHER PUBLICATIONS

Kelly, Bryan, "Project Cerberus Security Architecture Overview Specification", Retrieved From: https://github.com/opencomputeproject/Project_Olympus/blob/master/Project_Cerberus/Project%20Cerberus%20Architecture%20Overview.pdf, Sep. 28, 2017, 17 Pages.

Vaid, Kushagra, "Microsoft's Project Olympus Delivers Cloud Hardware Innovation at Scale", Retrieved From: https://azure.microsoft.com/en-in/blog/microsofts-project-olympus-delivers-cloud-hardware-innovation-at-scale/, Nov. 8, 2017, 7 Pages.

Weimer, et al., "Project Cerberus Firmware Update Specification", Retrieved From: https://github.com/opencomputeproject/Project_Olympus/blob/master/Project_Cerberus/Project%20Cerberus%20Firmware%20Update.pdf, Mar. 4, 2019, 28 Pages.

"International Search Report & Written Opinion issued in PCT Application No. PCT/US20/025860", dated May 19, 2020, 11 Pages.

* cited by examiner

ATTESTATION SERVICE FOR ENFORCING PAYLOAD SECURITY POLICIES IN A DATA CENTER

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers.

Users of the cloud system typically have direct access to the platform hardware and the operating systems and other applications running on the platform. In addition, cloud systems increasingly incorporate FPGAs, GPUs, and other SoCs that are interconnected with the host CPUs over high-speed buses. This further increases the attack surface via which malicious hackers can undermine the security of the hardware platform. Moreover, a data center includes additional devices, such as power supply unit controllers, rack controllers, or the like, which are also vulnerable to malicious hacking. Accordingly, there is a need for systems and methods for ensuring security of the hardware platform, including ensuring security of any payloads deployed in the cloud, such as any firmware updates or installs associated with the platform hardware.

SUMMARY

In one example, the present disclosure relates to a method including sending artifacts, including at least one artifact purportedly associated with a root of trust system corresponding to a device, to an attestation service, wherein the at least one artifact comprises at least one policy attribute related to payload security in the data center. The method may further include the attestation service determining whether the at least one policy attribute is acceptable.

In another example, the present disclosure relates to a method comprising an attestation client sending artifacts, including at least one artifact purportedly associated with a root of trust system corresponding to a host, to a certificate authority, where the at least one artifact comprises at least one policy attribute related to payload security in the data center. The method may further include the certificate authority: (1) extracting attestation data from the at least one artifact, (2) interacting with an attestation service to determine whether the at least one policy attribute is acceptable, and (3) denying a machine certificate to the host if the result of the determining step deems the at least one policy attribute unacceptable.

In yet another example, the present disclosure relates to a system comprising an attestation service and an attestation client. The attestation client may be configured to send artifacts, including at least one artifact purportedly associated with a root of trust system corresponding to a device, to the attestation service, where the at least one artifact comprises at least one policy attribute related to payload security in the data center. The attestation service may be configured to determine whether the at least one policy attribute is acceptable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to ensuring security of payloads that may be deployed in a public cloud, private cloud, or a hybrid cloud. Certain examples relate to enforcing payload security policies across the hardware platform that may be part of a cloud system. The payload security policies may be enforced using an attestation service, a certificate authority, and Root of Trust (RoT) controllers. Example payloads may include firmware updates to the platform hardware.

Figure 1:
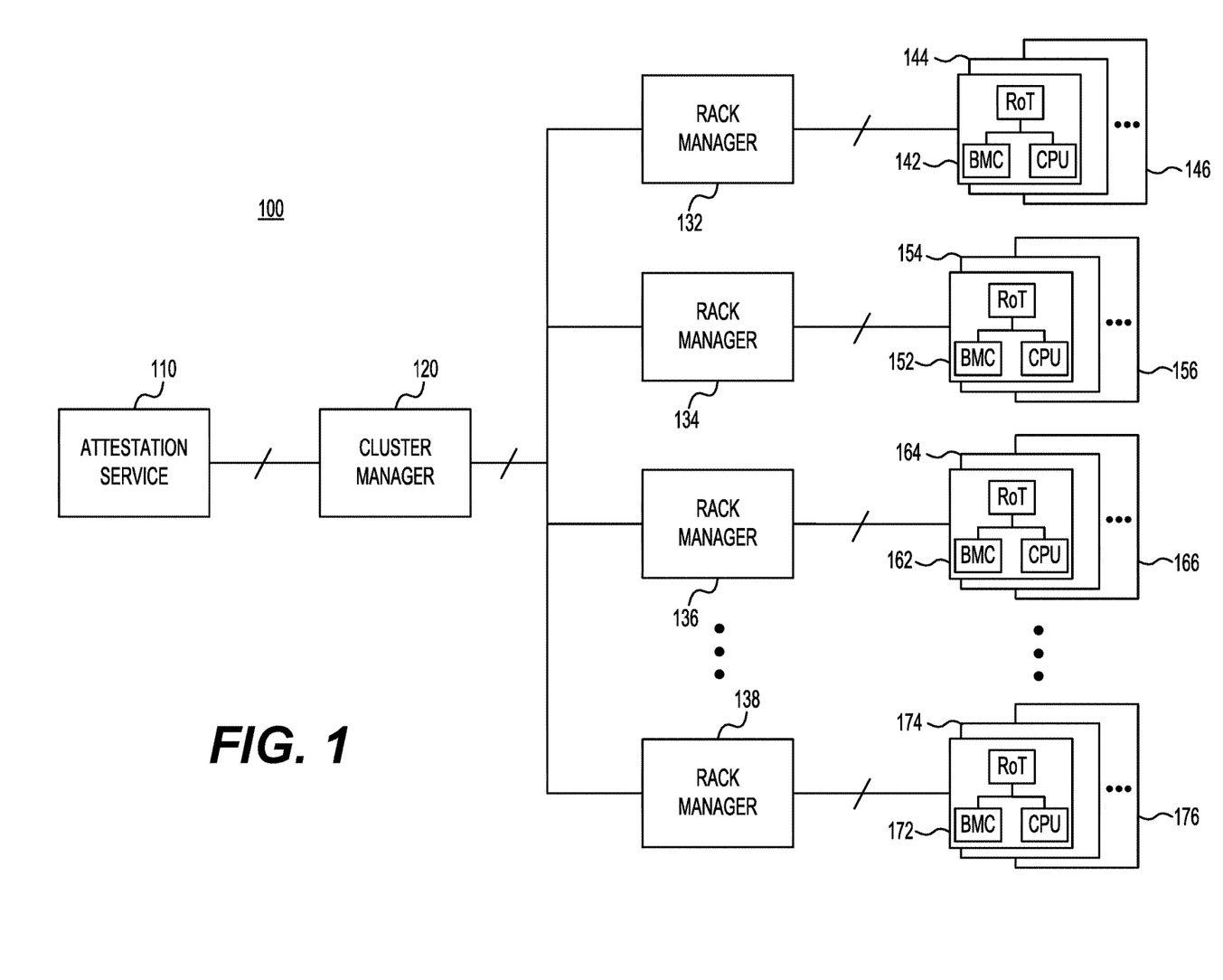
FIG. 1 is a diagram of a system environment for enforcing any payload security policies in a data center in accordance with one example.

FIG. 1 shows a diagram of a system environment 100 for enforcing any payload security policies in a data center in accordance with one example. An example data center may include several clusters of racks including platform hardware, such as server nodes, storage nodes, networking nodes, or other types of nodes. The data center may also include other hardware and software, including deployment and monitoring hardware and software. In this example, a payload security policy may be enforced using an attestation service 110. Attestation service 110 may be implemented at a data center level or at a higher level. As an example, attestation service 110 may be implemented as part of a data center management service. In this example, attestation service 110 may communicate with a cluster manager 120. Cluster manager 120 may communicate with the various rack managers in the data center. Thus, in this example, cluster manager 120 may communicate with rack managers 132, 134, 136, and 138. Each rack manager, in turn, may communicate with chassis mounted in the racks. As an example, rack manager 132 may communicate with chassis 142, 144, and 146. Rack manager 134 may communicate with chassis 152, 154, and 156. Rack manager 136 may communicate with chassis 162, 164, and 166. Rack manager 138 may communicate with chassis 172, 174, and 176.

With continued reference to FIG. 1, each chassis may include a motherboard that may include several components mounted thereon. As an example, chassis 142 may include a motherboard with a Baseboard Management Controller (BMC), a Central Processing Unit (CPU), and a Root of Trust (RoT). Similarly, each of the other chassis may include motherboards with these same components mounted thereon or different components mounted thereon. Attestation service 110 may communicate with each of the RoTs. Although FIG. 1 shows BMCs and CPUs as examples of the devices that may be subject to attestation, other devices may also be covered. Examples of devices include, but are not limited to, GPUs, FPGAs, FPGA instances, Complex Programmable Logic Devices (CPLDs), rack managers/controllers, chassis managers/controllers, power supply unit controllers, storage devices (e.g., SSDs or HDDs), networking devices (e.g., switches, routers, firewalls, and bridges), or any other devices in a data center that may require firmware updates. Although FIG. 1 describes the system environment in reference to firmware, other types of payloads may be used. Example payloads include, but are not limited to, firmware, settings, configuration, or other such information on devices that may need updating.

Figure 2:
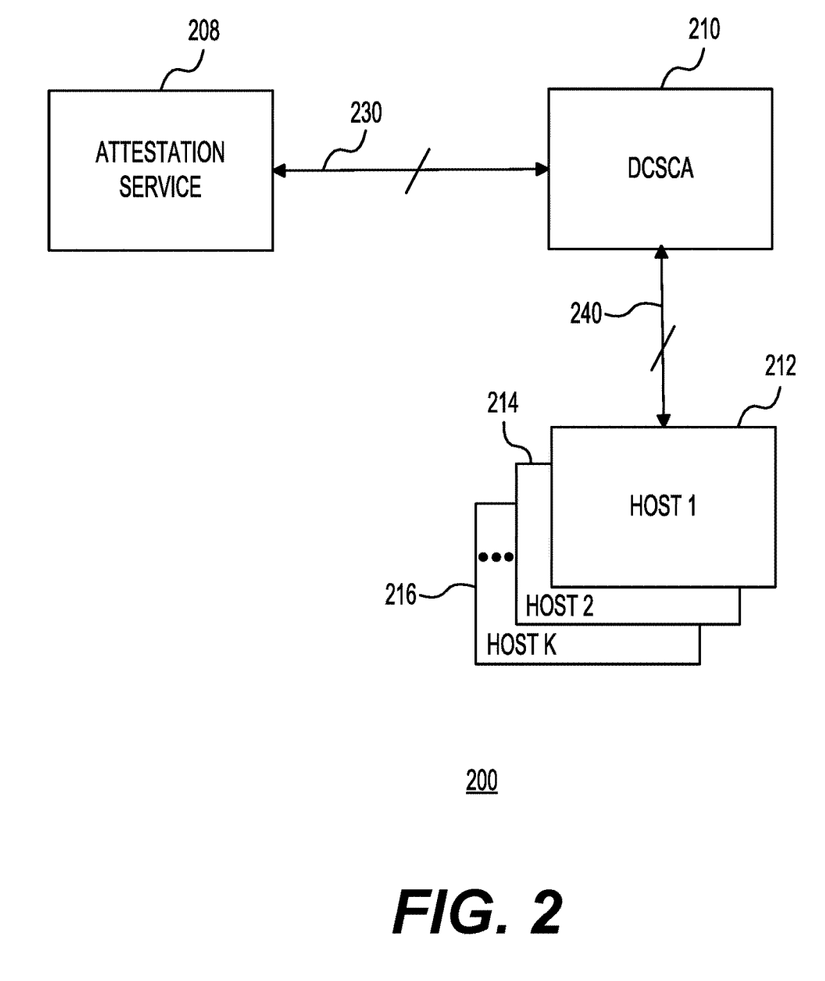
FIG. 2 shows a high-level diagram of a data center, including an attestation service in accordance with one example.

FIG. 2 shows a high-level diagram of a data center 200 including an attestation service 208 in accordance with one example. In this example data center 200 may include an Data Center Software Certificate Authority (DCSCA) 210 coupled to attestation service 208 via a bus 230. In one example, DCSCA 210 may implement an application programming interface (API); both attestation clients (e.g., clients situated at the hosts) and attestation service may use the API to interact with DCSCA 210. DCSCA 210 may be coupled to the various hosts in the data center, including HOST 1 212, HOST 2 214, and HOST K 216 via a bus 240. In the context of FIG. 1 and FIG. 2, the term bus as used in this disclosure includes, but is not limited to, signal lines, signal lines coupled via routers, switches, other networking equipment, signal lines coupled via networks of any kind, wireless connections, a combination of signal lines and wireless connections, switch fabrics, or the like. Attestation service 208 may be configured to check whether the hosts are healthy. In this example, attestation service 208 may accomplish this by validating certain attestation data received from the host. In one example, the attestation data may include a log of Trusted Platform Module (TPM) measurements (e.g., TcgLog) generated when booting a respective host. Alternatively, or additionally, the attestation data may include a log generated by a Root of Trust (RoT) system. In one example, the attestation policy may be an XML document that defines a "healthy" host.

With continued reference to FIG. 2, in this example, attestation service 208 is set up as a peer to DCSCA 210. When requesting a new machine certificate from DCSCA 210, a host (e.g., any one of HOST 1 212, HOST 2 214, or HOST K 216) may add measurements (e.g., TcgLog) and endorsement key related data (e.g., EKPub and EkCert) to the request and send the request to ACPA 210. DCSCA 210 may then forward this information to attestation service 208. In this example, attestation service 208 may validate that the logs comply with the attestation policy. If the validation is successful, attestation service 208 may encrypt and seal the machine certificate to the host trusted platform manager (TPM) and send it back to DCSCA 210. ACPA 210 may send the encrypted and sealed machine certificate to the host requesting the new machine certificate. Although FIG. 2 shows a certain number of components arranged and coupled in a certain way, fewer or additional components may be arranged and coupled differently to achieve the same objective. In addition, the functionality associated with any of attestation client, attestation service, and DCSCA may be distributed, as needed.

As an example, each node type (e.g., based on whether the node is a compute node, a storage node, or a networking node) may have an associated policy that may be managed at a cluster level. Table 1 below shows one arrangement for keeping track of the policies for each cluster in a data center (e.g., a data center having N clusters) and the status in terms of the compliance with the policies in a data center.

TABLE 1

| Cluster | Policies | Status |
|---|---|---|
| C1 | P1, P3, P5 | Full compliance |
| C2 | P1, P5, P6, P7 | Nodes N1 and N5 out of compliance |
| C3 | P2, P4, P5, P7 | Full compliance |
| ... | | |
| CN | P1, P2, P3 | Full compliance |

A specific policy (e.g., P1) may correspond to compute devices that have the same SKU or identical nodes. As an example, the policy P1 may correspond to all of the compute nodes that are configured using certain type of Intel processors and have the same configuration. As another example, the policy P2 may correspond to all of the storage nodes that include the same type of SSDs or other similar storage devices. As part of firmware deployment when updating firmware of certain type of devices, the attestation service may be notified of the changes in the payload security policies. Those changes may be made to Table 1 or similar other types of arrangements for keeping track of the policies. Each node (e.g., a server node) in the data center may have a unique identifier, e.g., a Globally Unique Identifier (GUID) that may be used to track the nodes as part of this table. Any node that is non-compliant may be taken out of the service. Although Table 1 shows the policies organized at a cluster level, in another example, the policies may be organized at the rack level. Each policy may contain enough information to enable the respective RoT to enforce the policy and report back any compliance issues.

Figure 3:
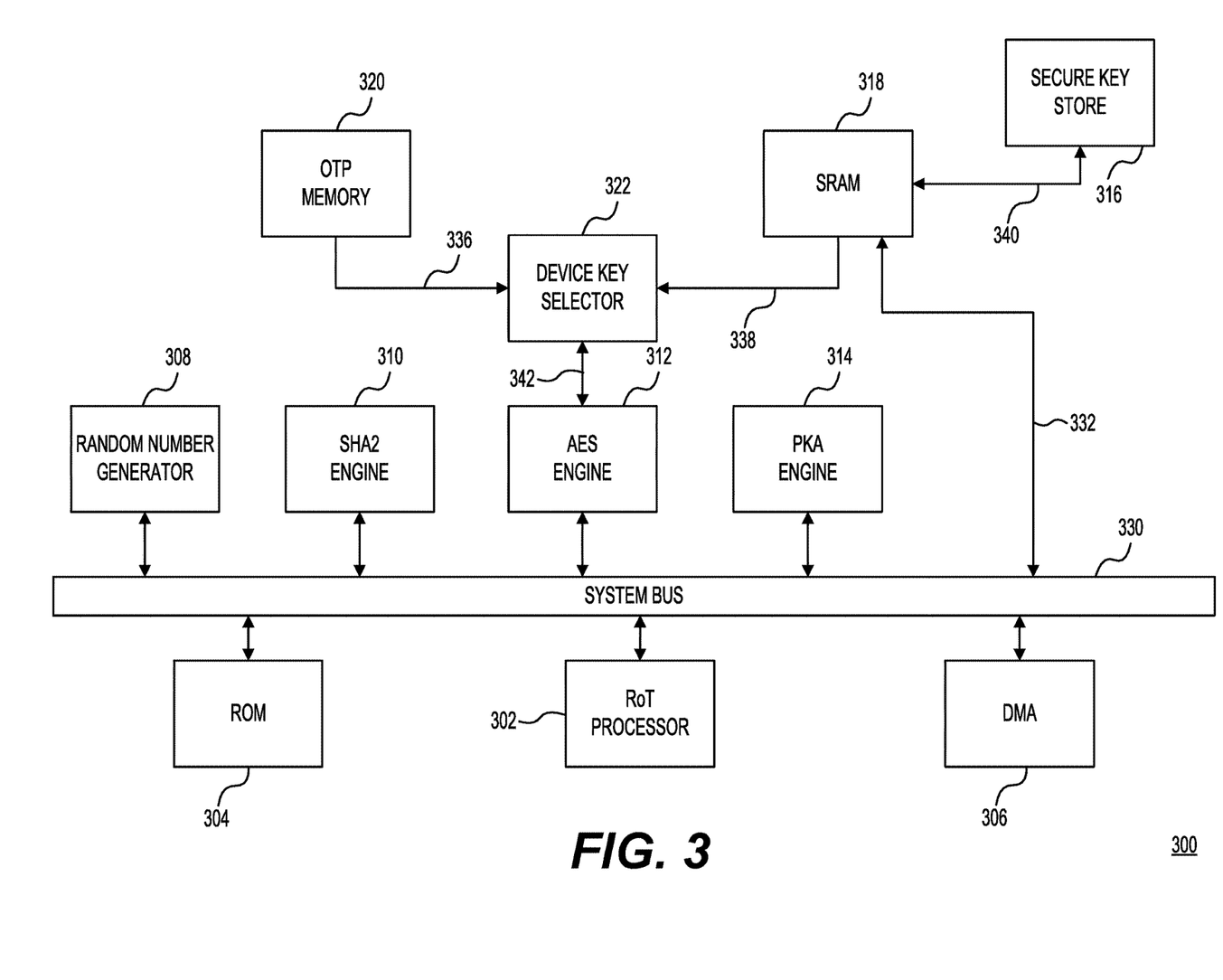
FIG. 3 is a block diagram showing components of a Root of Trust (RoT) system in accordance with one example.

FIG. 3 is a block diagram showing components of a Root of Trust (RoT) system 300 (e.g., any one of the RoTs shown in FIG. 1) in accordance with one example. In this example, RoT system 300 may act as an enforcement mechanism for an attestation service (e.g., attestation service 208). RoT system 300 may validate any firmware hashes against the stored hashes (e.g., hashes stored in a signed manifest) and may cut the power to components or devices (or otherwise quarantine them) that fail validation. Attestation service 200 will ensure that only hosts with acceptable versions of the signed manifests may pass attestation. In one example, at least some of the functionality associated with RoT system 300 may be implemented using a secure processor that includes secure memory, flash, cryptographic blocks, SPI/QSPI filter interfaces, e-fuses for authentication and manifest revocation, and tamper resistance. Each RoT system may enforce the policy, or the policies, that it has been made aware of by the attestation service. In some scenarios, the RoT system may not be aware of the most up to date policies that it may be required to enforce. As an example, a node may be taken out of service because the chassis supporting the node itself may be taken out of the rack and kept out of service for an extended period of time. At a later time, the chassis may be put back into service. At this point, the RoT system associated with the host may start enforcing the policies that are stored as part of the RoT, unaware of the fact that those policies might have been replaced or modified. To address this issue, the RoT system may be required to provide measurements, including information concerning the specific policy that the RoT is enforcing, to the attestation service. This way, the attestation service can detect any security related issues created by the deployment of the chassis that has an out of date policy.

As shown in FIG. 3, in this example, RoT system 300 may include a RoT processor 302, a read only memory (ROM) 304, a direct memory access (DMA) 306, a random number generator (RNG) 308, a secure hash algorithm 2 (SHA2) engine 310, an advanced encryption standard (AES) engine 312, and a public key accelerator (PKA) engine 314, coupled via a system bus 330. RoT system 300 may further include a secure key store 316, an SRAM 318, a one-time programmable (OTP) memory 320, and a device key selector 322. RNG 308 may be a true random number generator that could be used to generate additional random keys, as needed. SHA2 engine 310 may provide hardware support for generating 256-bit SHA2 hashes of data. SHA2 engine 310 may be configured to execute direct memory transfers via direct memory access (DMA) engine 306 to allow complete offload of the hashing of data. AES engine 312 may provide hardware acceleration for encrypting and decrypting data at boot time and during run-time. AES engine 312 may support the use of various key sizes, including key sizes of 128, 192, and 256 bits. AES engine 312 may access the secure keys from OTP memory 320 (e.g., via bus 336 and bus 342) or SRAM 318 (e.g., via bus 338 and bus 342). Any additional keys may be stored in SRAM 318 or may be stored by some other means by the software. In one example, SRAM 318 may include a physical unclonable function (PUF). The PUF may provide each device that includes RoT system 300 with a unique key that may be used to secure other aspects of the system as well as provide a secure way to store additional keys. The device key may not be directly accessed via software; instead the device key can be used with AES engine 312 to encrypt critical data in a device-specific way. PKA engine 314 may provide support for Rivet-Shamir-Adleman (RSA) and elliptic curve digital signature algorithm (ECDSA) signature generation and verification. PKA engine 314 may also be configured to execute direct memory transfers via DMA engine 306 to allow complete offload of the signature creation and verification processes.

With continued reference to FIG. 3, RoT system 300 may be interposed between the components and the flash memory (or another form of non-volatile memory) for storing the firmware and related information. RoT system 300 may limit read and write access to the different regions of the flash memory to prevent corruption and to ensure that the firmware is verified before it is transitioned to an active region of the flash memory. In terms of the operation of RoT system 300, in one example, when using secure boot with signed firmware images, only the firmware images signed with a private RSA key that matches the public key fused into OTP memory 320 may be loaded. Thus, in this example, the boot process for a device (e.g., a BMC or a CPU) may begin with the ROM bootloader reading the signed firmware image header. In this example, this image header will contain the signature of the image and the public key corresponding to the private key used to generate the signature. The signature may be a SHA256 hash of the firmware image. Once the image header is read, the public key may be extracted and a SHA256 hash is generated for the key. This hash may be compared to the hash of the public key fused in OTP memory 320. If these hashes match, RoT processor 302 may determine that the firmware image was signed with the correct key, so the boot may proceed. After validating the key used to the sign the firmware image, the firmware image itself may be validated. In this example, a SHA256 hash may be generated for the firmware image data and then compared with the signature that is decrypted with the included public key. If the hashes match, then the firmware image is believed to be valid and is loaded. Additional or fewer steps may be used in the process of validating the firmware image.

Still referring to FIG. 3, in one example, RoT system 300 may communicate with other components, such as the BMC or the CPU via a serial peripheral interface (SPI) bus. In other examples, other interfaces may be supported, including I²C and a general purpose input/output (GPIO) interface. RoT system 300 may communicate using both an in-band channel and an out-of-band channel. In one example, in-band channel may refer to the host, running on the CPU, being able to use a connection with the RoT system. In this example, the out-of-band channel may refer to the communication between the attestation service that bypasses the host. As an example, the attestation service may communicate through the BMC with the RoT system 300. In one example, this communication may occur over a secure Ethernet to I²C tunnel. In one example, if the BMC does not meet the policy requirements, then the BMC may still power itself using a limited capabilities version of the BMC allowing the BMC to communicate with the attestation service via the out-of-band channel. This may permit the attestation service to determine whether the node comprising the BMC is out of service because of a policy violation.

Attestation service (e.g., attestation service 208) may ensure a chain of trust by certifying the integrity of the boot sequence. Thus, in one example, the hash (e.g., SHA256 hash) of the boot sequence may be stored in a peripheral configuration register (PCR) in a TPM. Attestation service may collect measurement logs provided by the RoT system, parse the logs and calculate the PCR0 value for the RoT system. In this example, this value may be used to seal any response from the attestation service response to the RoT system. In one example, two levels of sealing may be used—one to the RoT system and one to the TPM associated with the host. In yet another example, the TPM functionality may be folded into the RoT system, obviating the need for double sealing.

At a high level, in terms of the process to attest hosts with the RoT system (e.g., RoT system 300), an attestation client associated with the attestation service may query the RoT system for the measurement logs (e.g., boot logs (referred to sometimes as the TcgLog)), the RoT system certification chain (e.g., including RoT system attestation certificate and other attestation certificates, such as the device identifier certification), and the version of the attestable hash of the platform firmware. In one example, the platform hash may be kept in the platform firmware manifest (PFM) and the component hashes may be kept in respective component firmware manifests (CFMs). In one example, the PFM may describe the firmware permitted on a platform. The CFM may describe the firmware permitted for components in the platform. In addition, the platform configuration data (PCD), specific to each SKU, may describe the number of component types in the platform and their respective locations. Thus, in one example, the PCD may include a manifest of all of the active components that are part of a platform. The manifest may include addresses, buses, firmware versions, digests, and public keys associated with the components. Table 2 below shows attributes stored in an example PFM for each component.

TABLE 2

| Attribute | Description |
| --- | --- |
| Description | Device Part or Description |
| Device Type | Underlying Device Type of Active Component (AC)-RoT |
| Remediation Policy | Policy or policies defining default remediation actions for integrity failure |
| Firmware Version | List of firmware versions |
| Flash Areas/Offsets | List of offset and digests, used and unused |
| Measurement | Firmware Measurements |
| Measurement Algorithm | Algorithm used to calculate measurement |
| Public Key | Public keys in the key manifest |
| Digest Algorithm | Algorithm used to calculate |
| Signature | Firmware signature(s) |

Next, the attestation client may send these artifacts to the DCSCA (e.g., DCSCA 210 of FIG. 2). DCSCA may forward this information to attestation service (e.g., attestation service 208), which may validate the public endorsement key (EKPub) for the TPM and the endorsement key certificate (EKCert) issued by the TPM's manufacturer. Attestation service may also verify the measurement logs against an attestation service policy. For those hosts that include the RoT system, the attestation service may verify that the requesting host is required to have the RoT system and whether the PFM version is acceptable. If these steps result in success, then, in this example, attestation service will encrypt and seal its response to both the TPM and to the RoT system and send it back to the host. In case of a failure to validate the above two conditions, the attestation service will fail attestation. As a result, in one example, DCSCA will deny the machine certificate to the host, and the host will not be able to participate in the cluster.

Figure 4A:
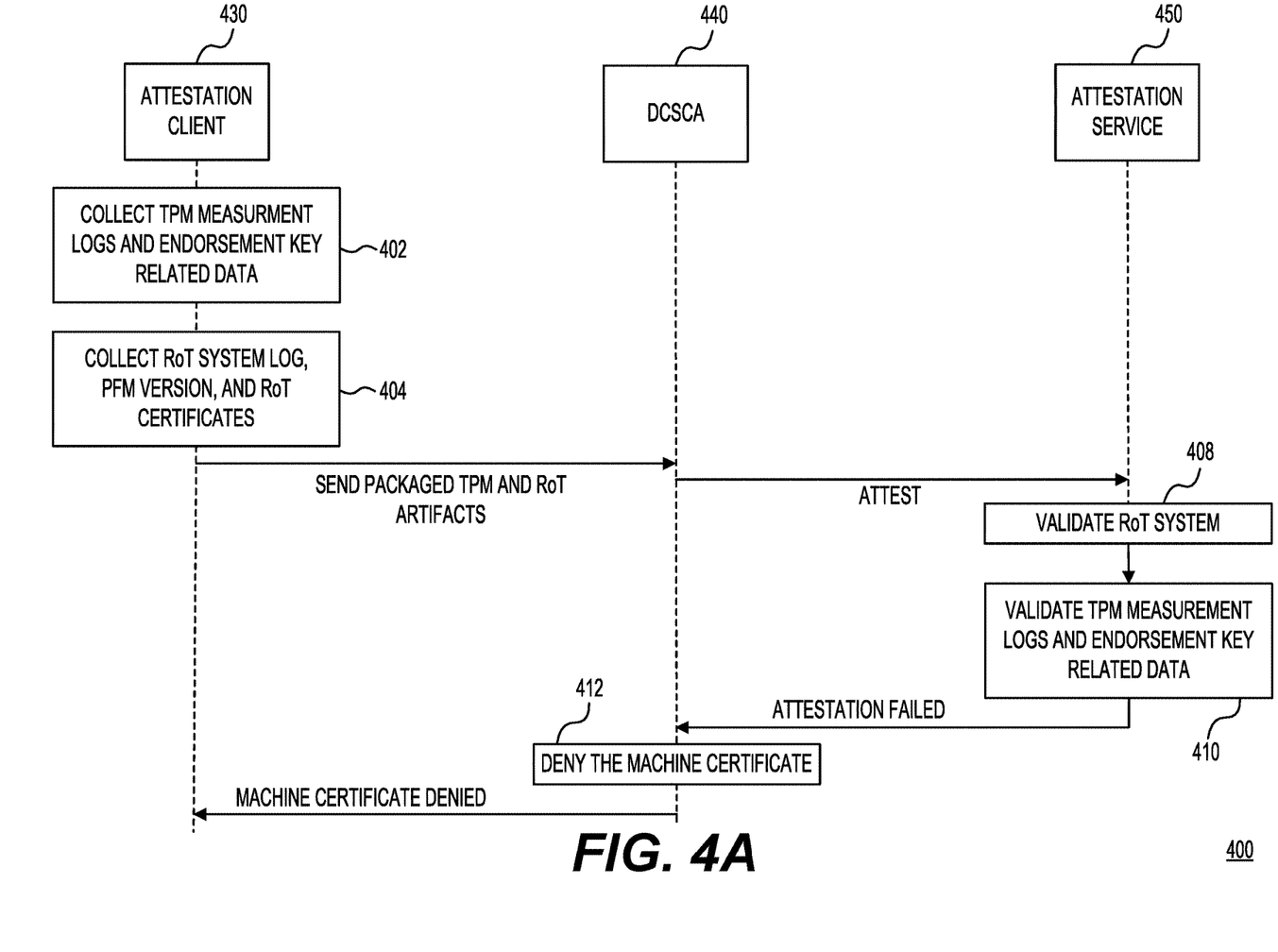
FIGS. 4A and 4B show attestation sequences in a data center in accordance with one example.
Figure 4B:
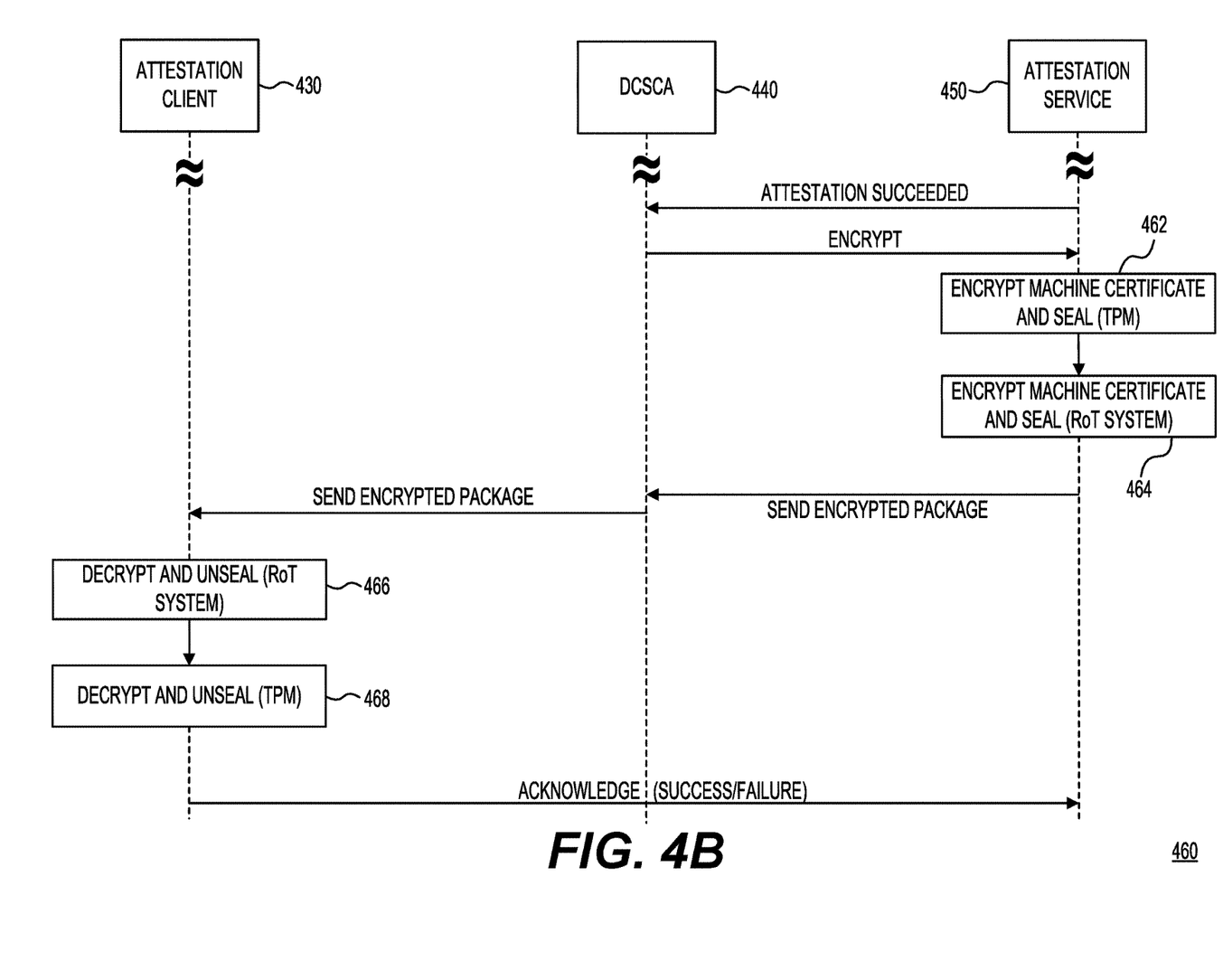

FIGS. 4A and 4B show attestation sequences 400 and 460 in a data center in accordance with one example. FIG. 4A shows an example attestation sequence 400 in which attestation fails at the attestation service. In this example, the attestation sequence includes actions and exchange of information among three entities: attestation client 430, Data Center Software Certificate Authority (DCSCA) 440, and attestation service 450. In one example, attestation client 430 may be implemented as a set of instructions executed by a processor associated with a host. Attestation client 430 may be invoked by bootstrap (e.g., Bootstrap32) or certificate agent services associated with each host. Attestation service 450 may be implemented as explained earlier with respect to FIG. 2 and FIG. 3. In step 402, attestation client 430 may collect TPM measurement logs (e.g., TcgLog) and endorsement key related data (e.g., public endorsement key (EKPub) for the TPM and the endorsement key certificate (EKCert) issued by the TPM's manufacturer). In one example, Bootstrap32 may invoke attestation client 430 at the time of system re-imaging or system update. Some data centers may include a set of clusters that include an integrated circuit chip including the RoT system (e.g., RoT system 300) and another set of clusters that include no such integrated circuit chip. In this example, attestation client 430 may require the RoT system to extend its PFM version to the pertinent TPM peripheral configuration register (PCR) (e.g., PCR 0). This may allow the attestation service to determine whether the host includes an integrated circuit chip including the RoT system. When this requirement is combined with the sealing operation, it may prevent an attacker from creating fake attestation requests, such as faking the presence of the integrated circuit chip including the RoT system in a motherboard associated with a host when none is present.

With continued reference to FIG. 4A, in step 404, attestation client 430 may invoke the software module associated with the RoT system to collect the RoT system log, the RoT PFM version, and the RoT system certificates, including any alias certificates and device identifier certificates. The RoT system may validate any associated platform hardware or components by validating the firmware hashes against known good hashes (e.g., as explained earlier with respect to FIG. 3). The RoT system log may include the firmware hashes, which may allow attestation service 450 to calculate the RoT system PCR0 value. This value may be used to seal the machine certificate to the integrated circuit chip including the RoT system. In this example, the RoT system PFM version describes the version of firmware hashes that the RoT system validates against. Attestation service 450 will enforce a minimal PFM version and will deny machine certificates to any host whose PFM version is below the stated minimum. This may prevent rollback attacks where an unauthorized firmware (e.g., an unpatched firmware) is successfully attested with an older version of the PFM associated with the RoT system. In this example, the RoT system attestation certificate will be used to encrypt and seal the machine certificate. The integrated circuit chip including the RoT system will decrypt the machine certificate if the unsealing operation is successful. Having collected the various TPM and the RoT system artifacts, attestation client 430 may package and send the packaged TPM and RoT artifacts to DCSCA 440. DCSCA 440 may receive the packaged artifacts and extract the artifacts and invoke attestation via the application program interface (API) associated with attestation service 450.

Still referring to FIG. 4A, attestation service 450 may validate the attest request. As part of this step, attestation service 450 may determine whether the request complies with the policies in effect. Thus, whether the RoT system is required to be associated with a device and the PFM version may be the policy attributes. The policy attributes may be per cluster, per SKU, or per host. If the policy requires the presence of the RoT system and there are no RoT system related artifacts included in the attest request, then as part of step 408, attestation service 450 may determine that the attest request is invalid. In the case where the RoT system is required and is present, then as part of step 408, attestation service may also determine whether the PFM version is acceptable. In this example, attestation service 450 may verify the presence of the RoT system and the PFM version by verifying the hash of TPM PCR # (e.g., PCR0) assuming PCR0 is the phase configuration register to which the PFM version was extended to by the RoT system. In addition, as part of step 408, attestation service 450 may also determine whether the configuration data (e.g., the PCD) is consistent with the expectations. As an example, attestation service 408 may determine whether the PCD indicates the same number of components (e.g., SSDs) as part of the platform (e.g., the host server) as are prescribed in the policy associated with the host, the cluster, or the data center.

With continued reference to FIG. 4A, in step 410, attestation service 410 may validate the TPM measurement logs and the endorsement key related data. The TPM measurement logs (e.g., TcgLog) may be validated against the attestation policies to determine whether certain debuggers are on, whether the hash of the code integrity policy matches the known good hashes, and whether, if applicable, secure boot is enabled. In one example, if validation fails in step 408, then attestation service 450 may send a response back to DCSCA 440 indicating that the attestation failed. In another example, even if validation fails in step 408, attestation service 450 may still perform step 410 to determine whether the TPM measurement data is valid. This may allow attestation service 450 to not only enforce policies related to the cluster, the SKUs, or the specific host hardware, but also determine whether there are other issues associated with the attest request from DCSCA 440. Thus, DCSCA 440 may receive detailed error information from attestation service 450. In this example, in step 412 of sequence 400, DCSCA 440 will deny the machine certificate to the host with the attestation client. This will prevent the motherboards, the BMC, or other component hardware associated with the host from booting up and thus ensuring that only the policy-compliant hardware is allowed to operate consistent with the data center policies. Although not shown in FIG. 4A, as needed, DCSCA 440 may notify a data center manager or other reporting entity a denial of the machine certificate to the host.

FIG. 4B shows an example attestation sequence 460 in which attestation succeeds at the attestation service. This sequence shows actions and steps that occur when attestation by attestation service 450 (e.g., in steps 408 and 410 of FIG. 4A) succeeds. Accordingly, in this example, the steps prior to the attestation failure in FIG. 4A will still be performed and the remaining steps in FIG. 4B will be performed if the attestation succeeds. Attestation service 450 may send a response to DCSCA 440 indicating that attestation succeeded. DCSCA 440 initiates the encryption process by calling an appropriate endpoint, e.g., an encryption endpoint.

With continued reference to FIG. 4B, in step 462, attestation service 450 may encrypt the machine certificate and seal it to the client TPM. This step may include the following actions: 1) generate a random AES key, 2) encrypt the machine certificate using the AES key, 3) seal the AES key to the appropriate TPM PCRs (in one example, attestation service 460 may calculate the values of these PCRs by parsing the events in the TPM measurements log (e.g., TcgLog)), and 4) create a TPM encrypted and sealed package including the encrypted machine certificate and the sealing state.

Next, in step 464, attestation service 450 may encrypt and seal the TPM encrypted and sealed package to the RoT system. This step may include the following actions: 1) generate a random seed value (e.g., 128 or 256 bits), 2) from the generated seed, derive an encryption key (EK) and a signing key (SK), 3) encrypt the TPM encrypted package using an AES key and the EK generated cipher text, 4) generate a sealing policy value, 5) generate an HMAC (a message authentication code) using the SK over the concatenation of cipher text and the sealing policy value, 6) encrypt the original seed using the RoT system public key (e.g. obtained from the RoT attestation certificate) to create an encrypted seed, and 7) create an RoT encrypted package using the encrypted seed, HMAC, cipher text, and the sealing policy value. Having created the encrypted package, attestation service 450 may send the encrypted package to DCSCA 440. ACPA 440 may send the encrypted package as part of its response to the host. In this example, the host can unseal the AES key and decrypt the cipher text only if the PCR0 value in the RoT system matches with the sealing policy value.

Still referring to FIG. 4B, in step 466, the RoT system may decrypt the package using the following actions: 1) decrypt the encrypted seed using the RoT system's private key, 2) from the decrypted seed derive EK and SK values, 3) using the SK, validate the HMAC over the cipher text and the sealing policy value, 4) examine the sealing policy value (e.g., to ensure compliance with the format (e.g., to ensure that all reserved fields are set to zero)), 5) if the expected PCR value is set to 0, then ignore the PCR value in the integrated circuit chip including the RoT system, and 6) otherwise, indicate failure and return the encryption key.

With continued reference to FIG. 4B, in step 468, the TPM encrypted package may be decrypted by attestation client 430 using the following steps: 1) unseal the AES key using the TPM, and 2) if the unsealing is successful, then use the AES key to decrypt the machine certificate. If, however, the unsealing fails, then attestation client 430 will set the machine certificate error counter for the host. Next, in this example, the host will acknowledge success or failure back to attestation service 450. Although FIG. 4B shows a certain sequence of steps, some of these steps may be omitted and others may be performed in a different order.

Figure 5:
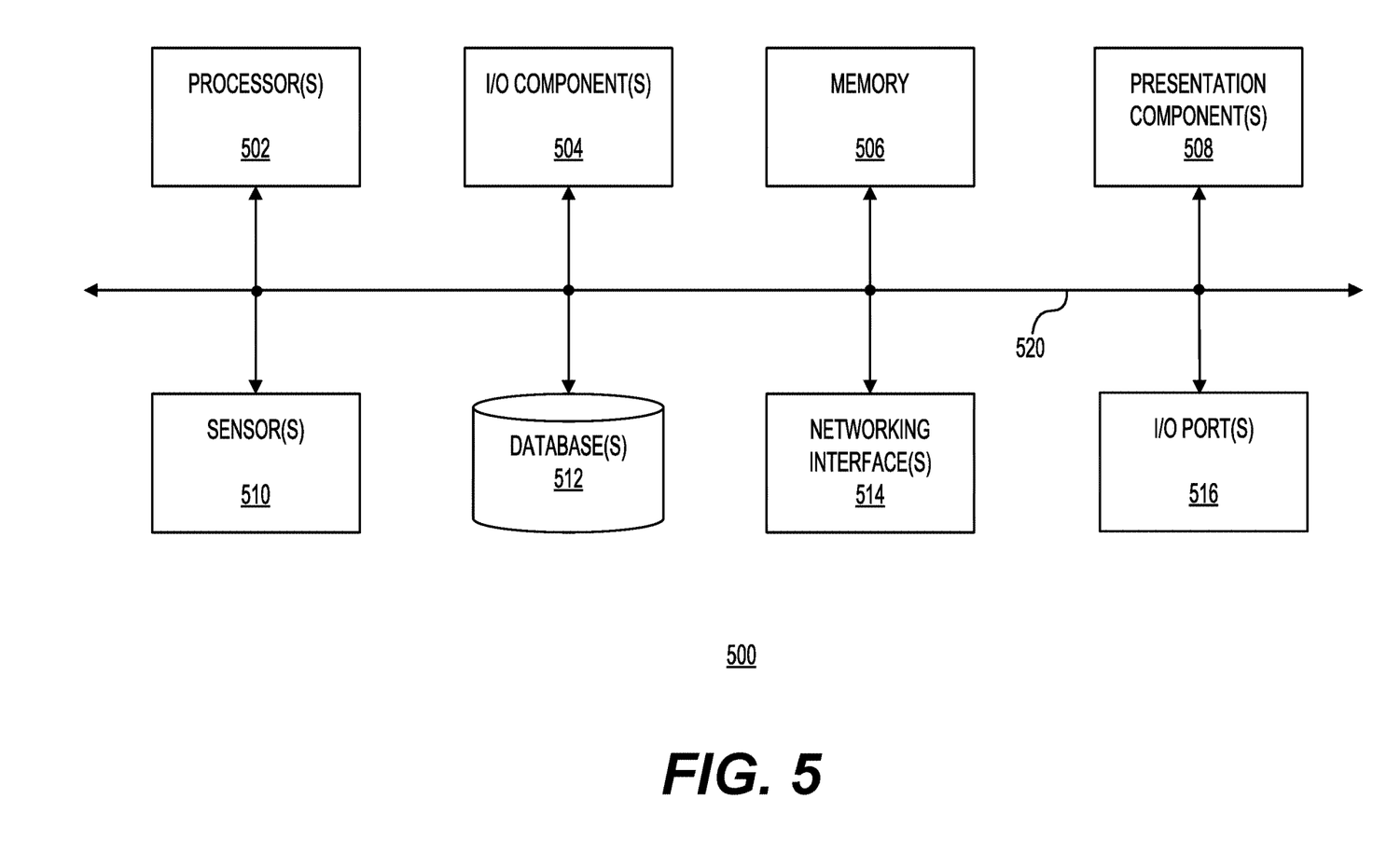
FIG. 5 shows a computing platform that may be used for implementing the attestation client, the data center software certificate authority (DCSDCSCA), or the attestation service in accordance with one example.

FIG. 5 shows a computing platform 500 that may be used for implementing the attestation client (e.g., attestation client 430), the DCSCA (e.g., DCSCA 440), or the attestation service (e.g., attestation service 450) in accordance with one example. Computing platform 500 may include processor(s) 502, I/O component(s) 504, memory 506, presentation component(s) 508, sensor(s) 510, database(s) 512, networking interface(s) 514, and I/O port(s) 516, which may be interconnected via bus 520. Processor(s) 502 may execute instructions stored in memory 506. The instructions may correspond to either one of the attestation client, the DCSCA, or the attestation service. I/O component(s) 504 may include components such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may be any type of display, such as LCD, LED, or other types of display, or other types of output components, including audio or haptic output components. Sensor(s) 510 may include telemetry or other types of sensors configured to detect, and/or receive, information (e.g., conditions associated with various components). Sensor(s) 510 may include sensors configured to sense conditions associated with CPUs, memory or other storage components, FPGAs, motherboards, baseboard management controllers, or the like. Sensor(s) 510 may also include sensors configured to sense conditions associated with racks, chassis, fans, power supply units (PSUs), or the like. Sensor(s) 510 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

With continued reference to FIG. 5, database(s) 512 may be used to store records related to the enforcement of the policies. In addition, database(s) 512 may also store data used for generating reports related to the enforcement of the policies, including any compliance related reports. Networking interface(s) 514 may include communication interfaces, such as Ethernet, cellular radio, Bluetooth radio, UWB radio, or other types of wireless or wired communication interfaces. I/O port(s) 516 may allow computing platform 500 to communicate with bus 520 or other I/O component(s) 504. Although FIG. 5 shows computing platform 500 as including a certain number of components arranged and coupled in a certain way, it may include fewer or additional components arranged and coupled differently. In addition, the functionality associated with computing platform 500 may be distributed or combined, as needed. Moreover, not all of the aspects of computing platform 500 may be needed to implement each of attestation client 430, DCSCA 440, and attestation service 450.

Figure 6:
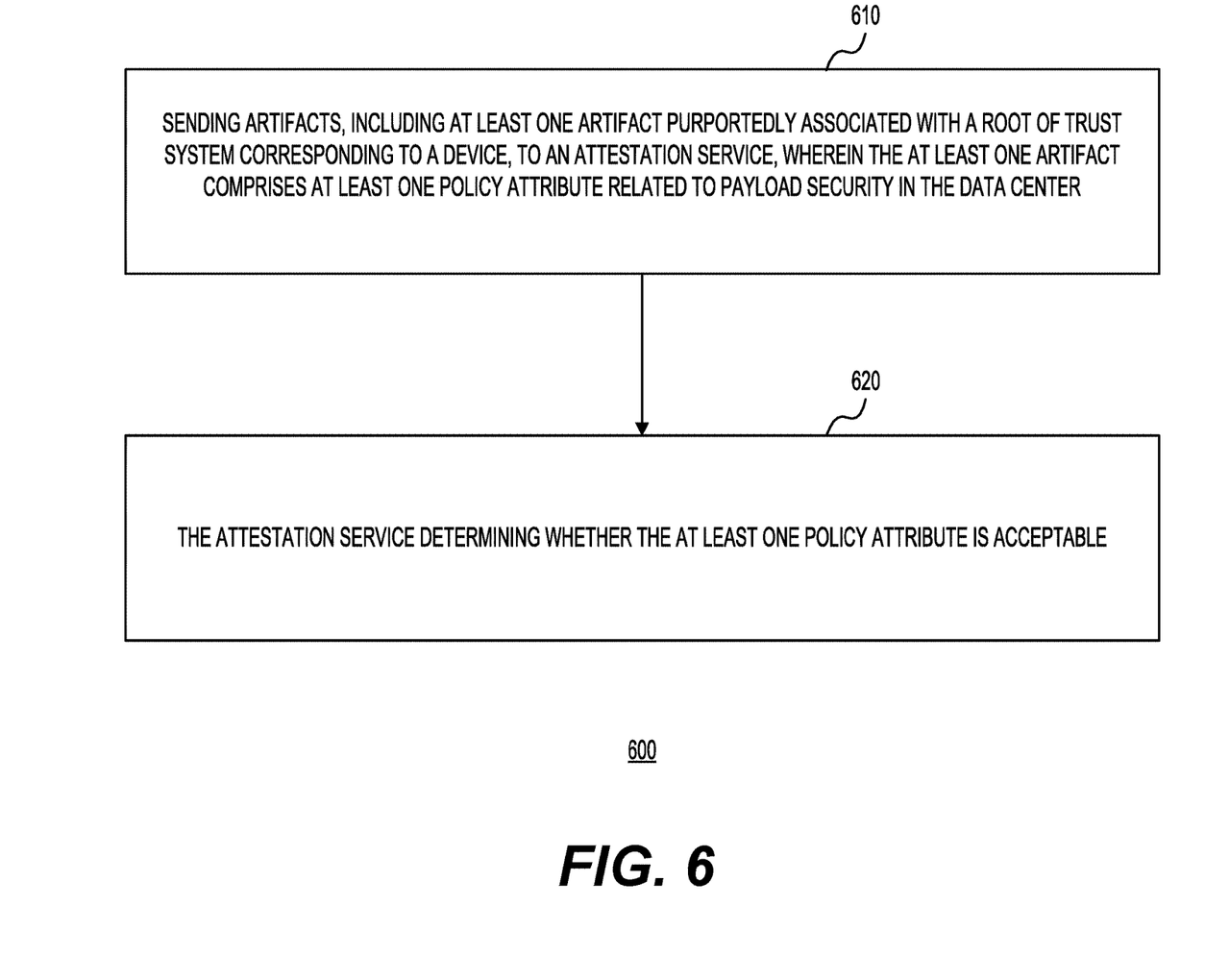
FIG. 6 shows a flow chart of a method related to an attestation service in accordance with one example.

FIG. 6 shows a flow chart 600 of a method related to an attestation service in accordance with one example. Step 610 may include sending artifacts, including at least one artifact purportedly associated with a root of trust system corresponding to a device, to an attestation service, where the at least one artifact comprises at least one policy attribute related to payload security in the data center. As explained earlier a malicious hacker may create fake artifacts, and in that instance the at least one artifact may not be associate with root of trust system; instead it may be a fake artifact. Thus, the step of sending of artifacts may include artifacts that are purportedly associated with the RoT system, but they may or may not be associated with the RoT system. In this example, this step may include attestation client 430 of FIG. 4A sending the artifacts to DCSCA 440 of FIG. 4A, which may then invoke an attestation service (e.g., attestation service 450 of FIG. 4A). The first part of this step may be performed when instructions corresponding to attestation client 430 are executed by a processor, such as processor(s) 502 of FIG. 5. In this example, this step may include at least steps 402 and 404 of sequence 400 shown in FIG. 4A. The second part of this step may be performed when instructions corresponding to DCSCA 440 are executed by a processor, such as processor(s) 502 of FIG. 5.

Step 620 may include the attestation service determining whether the at least one policy attribute is acceptable. In one example, this step may be performed when instructions corresponding to attestation service 450 of FIG. 4A are executed by a processor, such as processor(s) 502 of FIG. 4A. Although FIG. 6 shows certain number of steps being performed in a certain order, additional or fewer steps may be performed in the same order or a different order.

Figure 7:
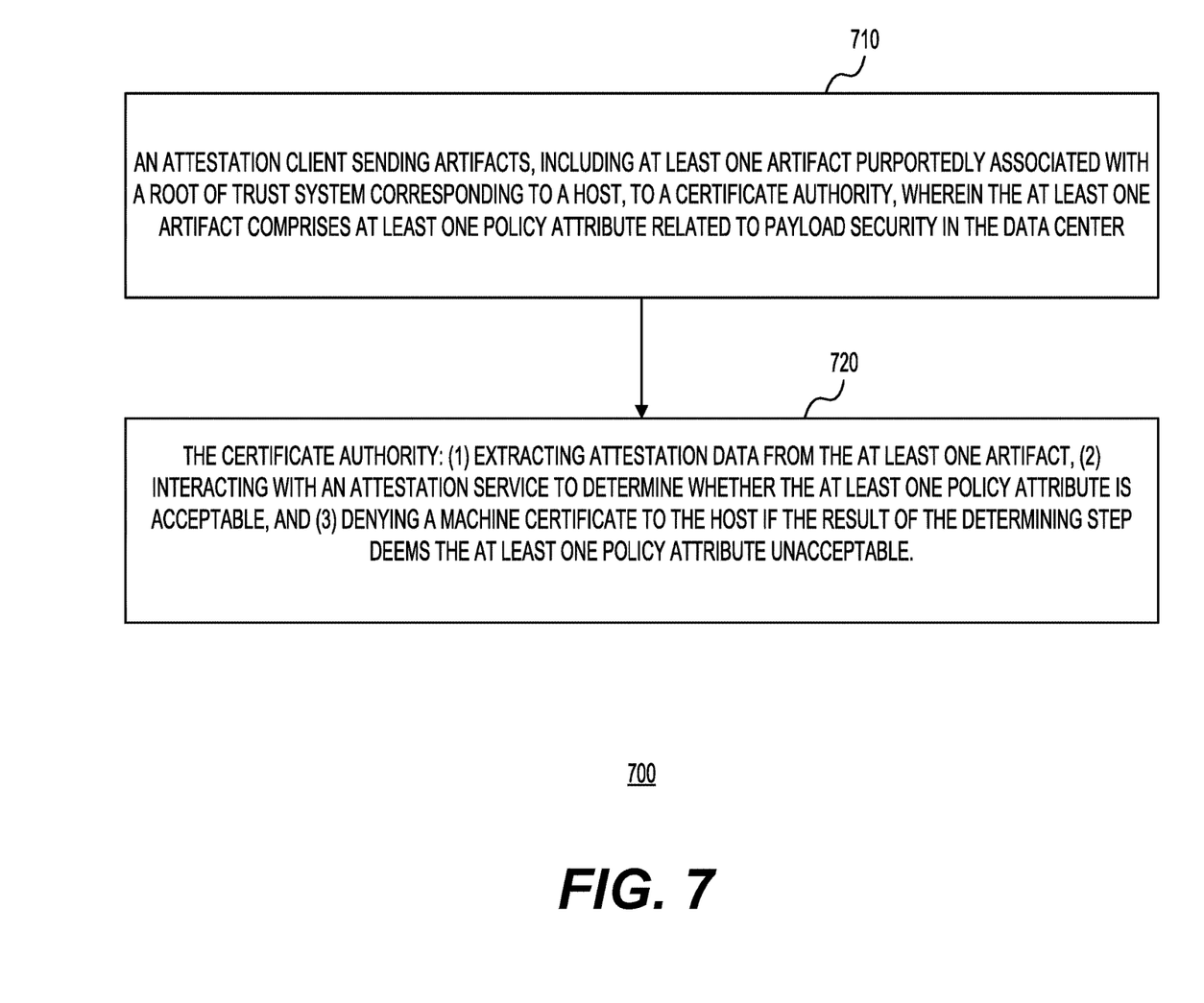
FIG. 7 shows a flow chart of another method related to an attestation service in accordance with one example.

FIG. 7 shows a flowchart of a method related to an attestation service in accordance with one example. Step 710 may include an attestation client sending artifacts, including at least one artifact purportedly associated with a root of trust system corresponding to a host, to a certificate authority, where the at least one artifact comprises at least one policy attribute related to payload security in the data center. In this example, this step may include attestation client 430 of FIG. 4A sending the artifacts to DCSCA 440 of FIG. 4A, which may then invoke an attestation service (e.g., attestation service 450 of FIG. 4A). The first part of this step may be performed when instructions corresponding to attestation client 430 are executed by a processor, such as processor(s) 502 of FIG. 5. In this example, this step may include at least steps 402 and 404 of sequence 400 shown in FIG. 4A. The second part of this step may be performed when instructions corresponding to DCSCA 440 are executed by a processor, such as processor(s) 502 of FIG. 5.

Step 720 may include the certificate authority: (1) extracting attestation data from the at least one artifact, (2) interacting with an attestation service to determine whether the at least one policy attribute is acceptable, and (3) denying a machine certificate to the host if the result of the determining step deems the at least one policy attribute unacceptable. In this example, this step may include DCSCA 440 of FIG. 4, as part of sequence 400, receiving the at least one extract, which may be a packaged artifact, extracting the attestation data from the packaged artifact, and invoking attestation via the application program interface (API) associated with attestation service 450 of FIG. 4. Attestation service 450 may perform steps 408 and 410 of sequence 400, as needed. Upon receiving an indication of the attestation failure (as shown in sequence 400 of FIG. 4), DCSCA 440 may deny a machine certificate to the host in step 412 of sequence 400. Although FIG. 7 shows certain number of steps being performed in a certain order, additional or fewer steps may be performed in the same order or a different order.

In conclusion, the present disclosure relates to a method including sending artifacts, including at least one artifact purportedly associated with a root of trust system corresponding to a device, to an attestation service, where the at least one artifact may comprise at least one policy attribute related to payload security in the data center. The method may further include the attestation service determining whether the at least one policy attribute is acceptable.

The method may further include the attestation service indicating to a certificate authority a result of the determining step. The method may further include the certificate authority denying a machine certificate to the device if the result of the determining step deems the at least one policy attribute unacceptable. The method may further include the certificate authority issuing a machine certificate to the device if the result of the determining step deems the at least one policy attribute is acceptable, the machine certificate may be double-sealed to first measurements from a root of trust system and second measurements from a trusted platform module.

The at least one policy attribute may relate to whether a root of trust system is associated with the device. The at least one policy attribute may comprise a firmware manifest associated with the device, and the determining whether the at least one policy attribute is acceptable may include determining whether a version associated with the firmware manifest is acceptable. The at least one policy attribute may comprise firmware measurements. The device may comprise one of, or any combination of, a motherboard, a central processing unit, a baseboard management controller, a graphics processing unit, a field programmable gate array (FPGA), an FPGA instance, a complex programmable logic device, a rack controller, a chassis controller, a power supply unit controller, a solid-state drive, a hard disk drive, or a networking device.

In another example, the present disclosure relates to a method comprising an attestation client sending artifacts, including at least one artifact purportedly associated with a root of trust system corresponding to a host, to a certificate authority, where the at least one artifact comprises at least one policy attribute related to payload security in the data center. The method may further include the certificate authority: (1) extracting attestation data from the at least one artifact, (2) interacting with an attestation service to determine whether the at least one policy attribute is acceptable, and (3) denying a machine certificate to the host if the result of the determining step deems the at least one policy attribute unacceptable.

The at least one policy attribute may relate to whether a root of trust system is associated with a device corresponding to the host. The at least one policy attribute may comprise a firmware manifest associated with a device corresponding to the host and the determining whether the at least one policy attribute is acceptable may include determining whether a version associated with the firmware manifest is acceptable. The at least one policy attribute may comprise firmware measurements.

In yet another example, the present disclosure relates to a system comprising an attestation service and an attestation client. The attestation client may be configured to send artifacts, including at least one artifact purportedly associated with a root of trust system corresponding to a device, to the attestation service, where the at least one artifact comprises at least one policy attribute related to payload security in the data center. The attestation service may be configured to determine whether the at least one policy attribute is acceptable.

The system may further comprise a certificate authority, where the attestation service may further be configured to indicate to the certificate authority a result of whether the at least one policy attribute is acceptable. The certificate authority may further be configured to deny a machine certificate to the device if the result indicates that the at least one policy attribute is unacceptable. The certificate authority may further be configured to issue a machine certificate to the device if the result indicates that the at least one policy attribute is acceptable.

The at least one policy attribute may relate to whether a root of trust system is associated with the device. The at least one policy attribute may comprise a firmware manifest associated with the device and the attestation service may further be configured to determine whether a version associated with the firmware manifest is acceptable. The at least one policy attribute may comprise firmware measurements. The device may comprise one of, or any combination of, a motherboard, a central processing unit, a baseboard management controller, a graphics processing unit, a field programmable gate array (FPGA), an FPGA instance, a complex programmable logic device, a rack controller, a chassis controller, a power supply unit controller, a solid-state drive, a hard disk drive, or a networking device.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for enforcing payload security policies in a data center, the method comprising:

at a first attestation client associated with a first host: (1) collecting a first artifact associated with a first root of trust system corresponding to a first device associated with the first host, and (2) sending the first artifact to an attestation service associated with the data center, wherein the first artifact comprises a first policy attribute related to a first payload security policy associated with a first cluster of nodes in the data center;

a second attestation client associated with a second host: (1) collecting a second artifact associated with a second root of trust system corresponding to a second device associated with the second host, and (2) sending the second artifact to the attestation service associated with the data center, wherein the second artifact comprises a second policy attribute related to a second payload security policy, different from the first payload security policy, associated with a second cluster of nodes in the data center;

the attestation service associated with the data center: (1) determining whether any of the first policy attribute or the second policy attribute is acceptable, and (2) indicating to a certificate authority associated with the data center a result of the determining step; and the certificate authority associated with the data center: (1) denying a first machine certificate to the first host if the result of the determining step deems the first policy attribute unacceptable, and (2) issuing a second machine certificate to the second host if the result of the determining step deems the second policy attribute acceptable.

2. The method of claim 1, wherein the second machine certificate is double-sealed to first measurements from the second root of trust system and second measurements from a trusted platform module associated with the second host.

3. The method of claim 1, wherein the first policy attribute relates to whether the first root of trust system is associated with the first device and wherein the second policy attribute relates to whether the second root of trust system is associated with the second device.

4. The method of claim 1, wherein the first policy attribute comprises a first firmware manifest associated with the first device and the second policy attribute comprises a second firmware manifest associated with the second device, and wherein the determining whether any of the first policy attribute and the second attribute is acceptable comprises determining whether a version associated with a respective firmware manifest is acceptable.

5. The method of claim 1, wherein the first policy attribute comprises a first set of firmware measurements and the second policy attribute comprises a second set of firmware measurements.

6. The method of claim 1, wherein each of the first device and the second device comprises one of, or any combination of, a motherboard, a central processing unit, a baseboard management controller, a graphics processing unit, a field programmable gate array (FPGA), an FPGA instance, a complex programmable logic device, a rack controller, a chassis controller, a power supply unit controller, a solid-state drive, a hard disk drive, or a networking device.

7. The method of claim 1, wherein each of the first cluster of nodes and the second cluster nodes comprises any combination of a first set of compute nodes, a second set of storage nodes, and a third set of networking nodes, and wherein each of the first security policy and the second security policy corresponds to one of the first set of compute nodes, the second set of storage nodes, or the third set of networking nodes.

8. The method of claim 1, wherein each of the first policy attribute and the second policy attribute corresponds to one of a plurality of attributes of a platform firmware manifest, wherein one of the plurality of attributes comprises default remediation actions in case of an integrity failure.

9. A method for enforcing payload security policies in a data center, the method comprising:
a first attestation client associated with a first host sending a first artifact, associated with a first root of trust system corresponding to a first device associated with a first host, to a certificate authority associated with the data center, wherein the first artifact comprises a first policy attribute related to payload security in the data center;
a second attestation client associated with a second host sending a second artifact associated with a second root of trust system corresponding to a second device associated with the second host, different from the first host, to the certificate authority associated with the data center, wherein the second artifact comprises a second policy attribute, different from the first policy attribute, related to payload security in the data center; and
the certificate authority: (1) extracting attestation data from both the first artifact and the second artifact, (2) interacting with an attestation service to determine whether any of the first policy attribute and the second policy attribute is acceptable, (3) denying a first machine certificate to the first host if the result of the determining deems the first policy attribute unacceptable and (4) issuing a second machine certificate to the second host if the result of the determining deems the second policy attribute acceptable.

10. The method of claim 9, wherein the first policy attribute relates to whether the first root of trust system is associated with the first device and wherein the second policy attribute relates to whether the second root of trust system is associated with the second device.

11. The method of claim 9, wherein the first policy attribute comprises a first firmware manifest associated with the first device and the second policy attribute comprises a second firmware manifest associated with the second device, and wherein the determining whether any of the first policy attribute and the second policy attribute is acceptable comprises determining whether a version associated with a respective firmware manifest is acceptable.

12. The method of claim 9, wherein the first policy attribute comprises a first set of firmware measurements and the second policy attribute comprises a second set of firmware measurements.

13. A system comprising:
a first attestation client configured to send artifacts, including a first artifact associated with a first root of trust system corresponding to a first device associated with a first host, to an attestation service associated with a data center, wherein the first artifact comprises a first policy attribute related to a first payload security policy associated with a first cluster of nodes in the data center;
a second attestation client configured to send artifacts, including a second artifact associated with a second root of trust system corresponding to a second device associated with a second host, to the attestation service, wherein the second artifact comprises a second policy attribute related to a second payload security policy, different from the first payload security policy, associated with a second cluster of nodes in the data center;
the attestation service associated with the data center configured to: (1) determine whether any of the first policy attribute and the second policy attribute is acceptable, and (2) indicate to a certificate authority associated with the data center a result of determining whether any of the first policy attribute and the second policy attribute is acceptable; and
a certificate authority associated with the data center configured to: (1) deny a first machine certificate to the first host if the result of the determining deems the first policy attribute unacceptable, and (2) issue a second machine certificate to the second host if the result of the determining deems the second policy attribute acceptable.

14. The method of claim 9, wherein each of the first policy attribute and the second policy attribute corresponds to one of a plurality of attributes of a platform firmware manifest, wherein one of the plurality of attributes comprises default remediation actions in case of an integrity failure.

15. The system of claim 13, wherein each of the first cluster of nodes and the second cluster nodes comprises any combination of a first set of compute nodes, a second set of storage nodes, and a third set of networking nodes, and wherein each of the first security policy and the second security policy corresponds to one of the first set of compute nodes, the second set of storage nodes, or the third set of networking nodes.

16. The system of claim 13, wherein the first policy attribute relates to whether the first root of trust system is associated with the first device and wherein the second policy attribute relates to whether the second root of trust system is associated with the second device.

17. The system of claim 13, wherein each of the first policy attribute comprises a first firmware manifest associated with the first device and the second policy attribute comprises a second firmware manifest associated with the second device, and wherein the attestation service is further configured to determine whether a version associated with a respective firmware manifest is acceptable.

18. The system of claim 13, wherein the first policy attribute comprises a first set of firmware measurements and the second policy attribute comprises a second set of firmware measurements.

19. The system of claim 13, wherein each of the first device and the second device comprises one of, or any combination of, a motherboard, a central processing unit, a baseboard management controller, a graphics processing unit, a field programmable gate array (FPGA), an FPGA instance, a complex programmable logic device, a rack controller, a chassis controller, a power supply unit controller, a solid-state drive, a hard disk drive, or a networking device.

20. The system of claim 13, wherein each of the first policy attribute and the second policy attribute corresponds to one of a plurality of attributes of a platform firmware manifest, wherein one of the plurality of attributes comprises default remediation actions in case of an integrity failure.

* * * * *